United States Patent [19]
Herron et al.

[11] Patent Number: 6,050,052
[45] Date of Patent: Apr. 18, 2000

[54] ROUND BALER HAVING POSITIVE START WRAPPER DISPENSING MECHANISM

[75] Inventors: Maynard M. Herron; Howard J. Ratzlaff, both of Hesston, Kans.

[73] Assignee: Hay & Forage Industries, Hesston, Kans.

[21] Appl. No.: 09/098,972

[22] Filed: Jun. 17, 1998

[51] Int. Cl.[7] ........................................ B65B 11/04
[52] U.S. Cl. .................................. 53/118; 53/587
[58] Field of Search .................... 53/118, 587, 389.5, 53/211, 215; 100/87

[56] References Cited

U.S. PATENT DOCUMENTS

| | | | |
|---|---|---|---|
| 4,779,526 | 10/1988 | Frerich et al. | 53/118 X |
| 4,790,125 | 12/1988 | Merritt | 53/118 X |
| 5,129,207 | 7/1992 | Butler . | |
| 5,129,208 | 7/1992 | Van Zee . | |
| 5,181,368 | 1/1993 | Anstey et al. | 53/118 X |
| 5,349,806 | 9/1994 | Swearingen et al. . | |
| 5,729,953 | 3/1998 | Fell et al. . | |

*Primary Examiner*—Linda Johnson
*Attorney, Agent, or Firm*—Hovey, Williams, Timmons & Collins

[57] ABSTRACT

A round baler is disclosed as including an improved bale wrapping mechanism that provides positive feeding of the wrapper at the start of the wrapping cycle. The mechanism includes a shiftable frame carrying a pair of feed rollers, with one of the rollers being brought into engagement with a stretch of the belts moving toward the baling chamber when the frame is shifted to a starting position. The wrapping mechanism is configured so that the belt stretch and the one feed roller cooperatively define a nip that is located downstream along the wrapper path from the nip defined between the feed rollers. A cutting assembly is disposed to sever the wrapper at a point spaced downstream from the nip defined between the belt stretch and the one roller, thereby insuring the wrapper presents a free end that is trapped between the one roller and the belt stretch when the frame is moved to the starting position. The wrapper is consequently gripped between the belts and the one feed roller so as to be pulled from its supply.

21 Claims, 9 Drawing Sheets

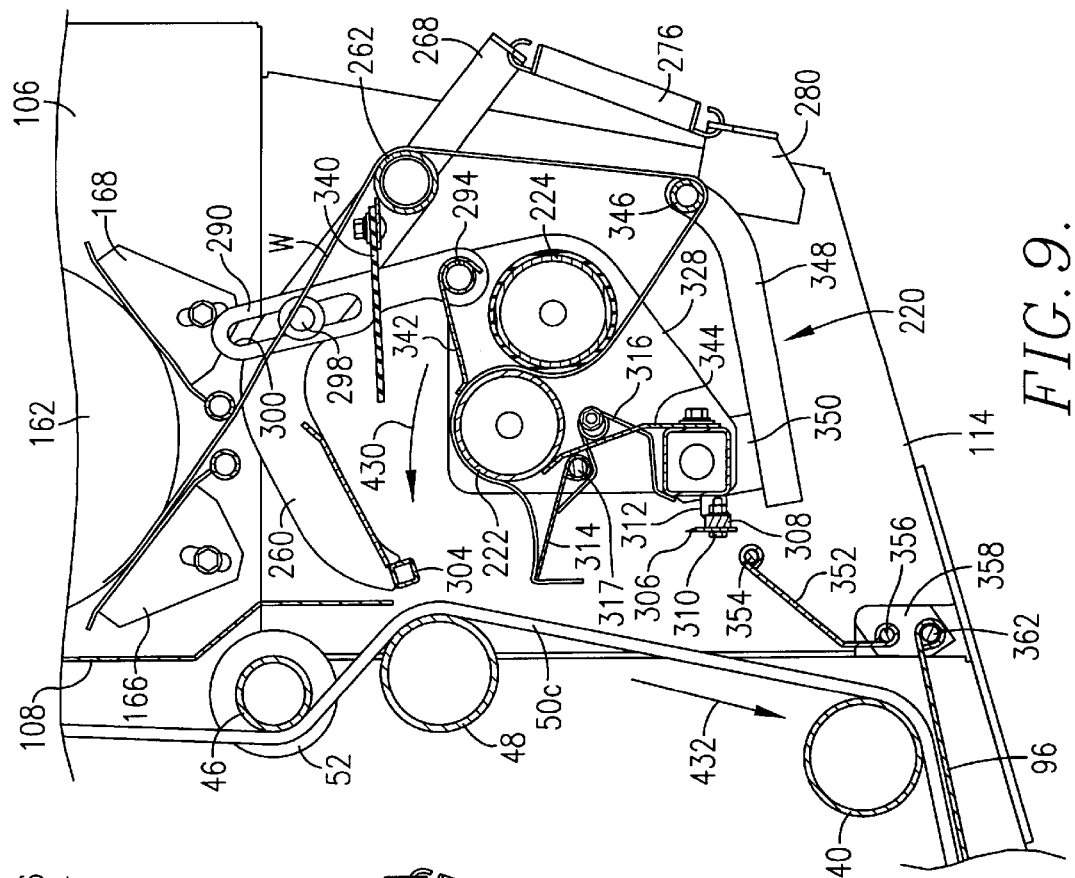

ROUND BALER HAVING POSITIVE START WRAPPER DISPENSING MECHANISM

BACKGROUND OF THE INVENTION

1. Field of the Invention

The present invention relates generally to round balers and, more particularly, to an improved bale wrapping mechanism that provides, among other things, improved feeding of the wrapper at the initiation of the wrapping cycle, which serves to eliminate many of the problems commonly associated with conventional wrapper mechanisms.

2. Discussion of Prior Art

An important, yet all too often problematic, part of baling operations involves wrapping of the bale once it has been formed. It has been determined that such problems are often attributable to the lightweight and flimsy nature of preferred wrapping materials. Particularly, movement of the wrapper from its source to the baling chamber is highly susceptible to being affected by factors such as wind, static electricity, etc. Although these factors may be relatively inconsequential to other baling operations, they have the potential of causing the wrapper to be misdirected or caught upon some part of the baler disposed along the wrapper path of travel. For example, even slight winds can blow the wrapper off course such that continued feeding of the wrapper will cause the wrapper to accumulate in undesirable areas.

It will be appreciated by those ordinarily skilled in the art that a significant number of conventional wrapper dispensing mechanisms are designed so that the wrapper is pulled from its source by the bale and/or the bale forming mechanism once the wrapper has been fed sufficiently toward or into the baling chamber. Accordingly, movement of the wrapper is positively controlled once it has been grasped by the bale and/or the bale forming mechanism, thereby reducing the likelihood of the above-noted problems. In most instances, however, the wrapper must initially travel some distance before being grasped by the bale and/or the bale forming mechanism. For example, wrapper dispensing mechanisms will often be spaced some distance from the baling chamber, such as along the rear wall of the baler. Consequently, most of these dispensing mechanisms include feed rollers for initially feeding the wrapper to the point at which it is grasped by the bale or bale forming mechanism.

Obviously, the speed of the feed rollers must be coordinated with the speed at which wrapper will be pulled by the bale and/or forming mechanism, otherwise, back-wrapping onto the feed rollers and various other problems may occur. In an attempt to resolve the problems associated with overfeeding or underfeeding of the wrapper by the feed rollers, one expedient suggests drivingly connecting the feed rollers to one of the bale forming rolls in such a manner that the feed rollers are rotated at a slower speed than the speed at which the forming mechanism will pull the wrapper from its source (for eliminating overfeeding problems), and providing the drive with an overrunning clutch that allows free rotation of the rollers when the wrapper is pulled by the forming mechanism at a speed faster than that at which the rollers are rotating (for eliminating underfeeding problems). Such an expedient is the subject of U.S. Pat. No. 5,729,953, issued Mar. 24, 1998, entitled Round Bale Wrapper Dispensing Apparatus, assigned of record to the assignee of the present application. Yet there is still an initial path along which the wrapper must travel before it is positively grasped by the bale and/or the bale forming mechanism. As with baler shown in the '953 patent, a majority of conventional wrapper dispensing mechanisms rely on the wrapper being fed by the rollers and guided by gravity along this initial path. However, as noted above, movement of the wrapper along this initial path may be adversely affected by various factors, such as the wind or static electricity. For example, untoward wind or static electricity may cause the wrapper to catch on the cutting mechanism or some other structure disposed along the initial path of the wrapper, whereby continued feeding of the wrapper by the feed rollers results in undesirable accumulation or back-wrapping onto the rollers.

Another problem associated with conventional wrapper dispensing mechanisms involves cutting the wrapper as the wrapping cycle is completed. Those ordinarily skilled in the art will appreciate that incomplete severance of the wrapper can result in lost time and material and, in some cases, damage to the baler. These problems are especially troublesome with common mesh-type wrappers formed of several intertwined strands, with each strand having the potential of unraveling or clumping together the entire web if left uncut at the end of the wrapping cycle. Many wrapping materials have tremendous resiliency and therefore require controlled cutting; otherwise, the wrapper may spring back into an uncontrollable mass or out of engagement with the feed rollers. In addition, when the cutter fails to make a clean cut of the wrapper, the unsevered portion of the wrapper may snag on the cutter and consequently obstruct movement of the wrapper toward the baling chamber.

Yet another recognized problem with conventional wrapper dispensing mechanisms involves loading new supplies of wrapping material. For example, the rolls of solid or mesh-type webs can be relatively heavy and unwieldy, however, these rolls are often housed within compartments on the baler that are inconvenient and difficult to access.

OBJECTS AND SUMMARY OF THE INVENTION

Responsive to these and other problems, an important object of the present invention is to provide a round baler having an improved wrapper dispensing mechanism that virtually eliminates the problems commonly associated with conventional mechanisms. More particularly, an important object of the present invention is to provide a wrapper dispensing mechanism that provides positive control of movement of the wrapper during the entire wrapping cycle (i.e., from the point the wrapper is initially fed toward the baling chamber until the wrapper is severed by the cutter). In this respect, an important object of the present invention is to provide a wrapper dispensing mechanism that places the wrapper immediately into contact with the bale forming mechanism when feeding of the wrapper is first started, whereby the bale forming mechanism positively controls movement of the wrapper until it is severed. Another important object of the present invention is to provide a wrapper dispensing mechanism with a cutter disposed to sever the wrapper at a point spaced downstream from the point at which the wrapper is initially placed into contact with the bale forming mechanism, such that even the most resilient wrapping materials are unlikely to spring completely out of disengagement with the feed rollers of the dispensing mechanism. It is also an important object of the present invention to provide a wrapper dispensing mechanism that draws the wrapper taut during the cutting action to ensure complete severance of the wrapper. Yet another important object of the present invention is to provide a wrapper dispensing mechanism that provides a compartment for housing a roll of bale wrapping material that is convenient to access and relatively easy to load.

In accordance with these and other objects evident from the following description of the preferred embodiment of the invention, the round baler includes a wrapping mechanism having a moveable frame that carries a pair of co-acting feed rollers. A power apparatus, such as a hydraulic cylinder, is provided for moving the frame to a starting position in which one of the rollers contacts a stretch of the bale forming belts moving toward the chamber opening. The wrapping mechanism is configured so that the belt stretch and the one feed roller cooperatively define a nip that is located downstream along the wrapper path from the nip cooperatively defined by the feed rollers. The mechanism further includes a cutter disposed to sever the wrapper at a point spaced downstream from the nip defined between the belt stretch and the one roller, thereby ensuring the wrapper presents a free end that is trapped between the one roller and the belt stretch when the frame is moved to the starting position. Accordingly, when the frame is moved to the starting position, the wrapper is gripped between the belts and the one feed roller so as to be pulled from the wrapper supply. In addition, the feed rollers are rotated as a result of the interengagement between the one feed roller and the belts, and consequently, the wrapper also passes through the nip defined between the feed rollers. Once the wrapper enters the baling chamber, the frame may be shifted away from the belts to an intermediate position in which the second nip no longer exists so that the rotating bale is pulling the wrapping material without assistance of the second nip.

In view of the foregoing, movement of the wrapper toward the baling chamber is positively controlled during virtually the entire wrapping cycle. Particularly, the wrapping cycle begins with the frame resting in a home position, with the one feed roller disengaged from the belt stretch. Consequently, no wrapper is being pulled from its supply at this time. However, the wrapper is placed directly into contact with the belt stretch once the power apparatus shifts the frame to its starting position. Thereafter the wrapper is pulled from its source, as explained above, and moved toward the baling chamber by the belt stretch. In this respect, because the wrapper is not pulled from its source until being placed into contact with the belt stretch, there is no initial path along which the wrapper must travel before its movement toward the baling chamber is positively controlled. In addition, with the frame subsequently being moved to the intermediate position, the bale pulls the wrapper from its supply and cooperates with the belt stretch to positively control movement of the wrapper along its path extending from the supply to the chamber. The wrapping cycle is completed with the frame being returned to its home position and the wrapper being severed.

The present invention also concerns a round baler having a compartment for storing an elongated roll of bale wrapping material. A support is located within the compartment and is configured to support the roll of material in such a manner that the longitudinal axis of the roll is oriented generally transverse to the normal direction of travel of the baler. A loading hole is provided in the compartment in general alignment with the structure for allowing endwise loading of replacement rolls of wrapping material.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 8 is an enlarged, fragmentary left side elevational view of the lower rear portion of the baler shown in FIG. 1, with the cover and left sidewalls of the dispensing mechanism being broken away to illustrate, among other things, the configuration of the mechanism when the frame is in the home position;

FIG. 9 is an enlarged, fragmentary left side elevational view similar to FIG. 8, but illustrating the configuration of the dispensing mechanism as the frame shifts toward the starting position;

Figures 1, 12:
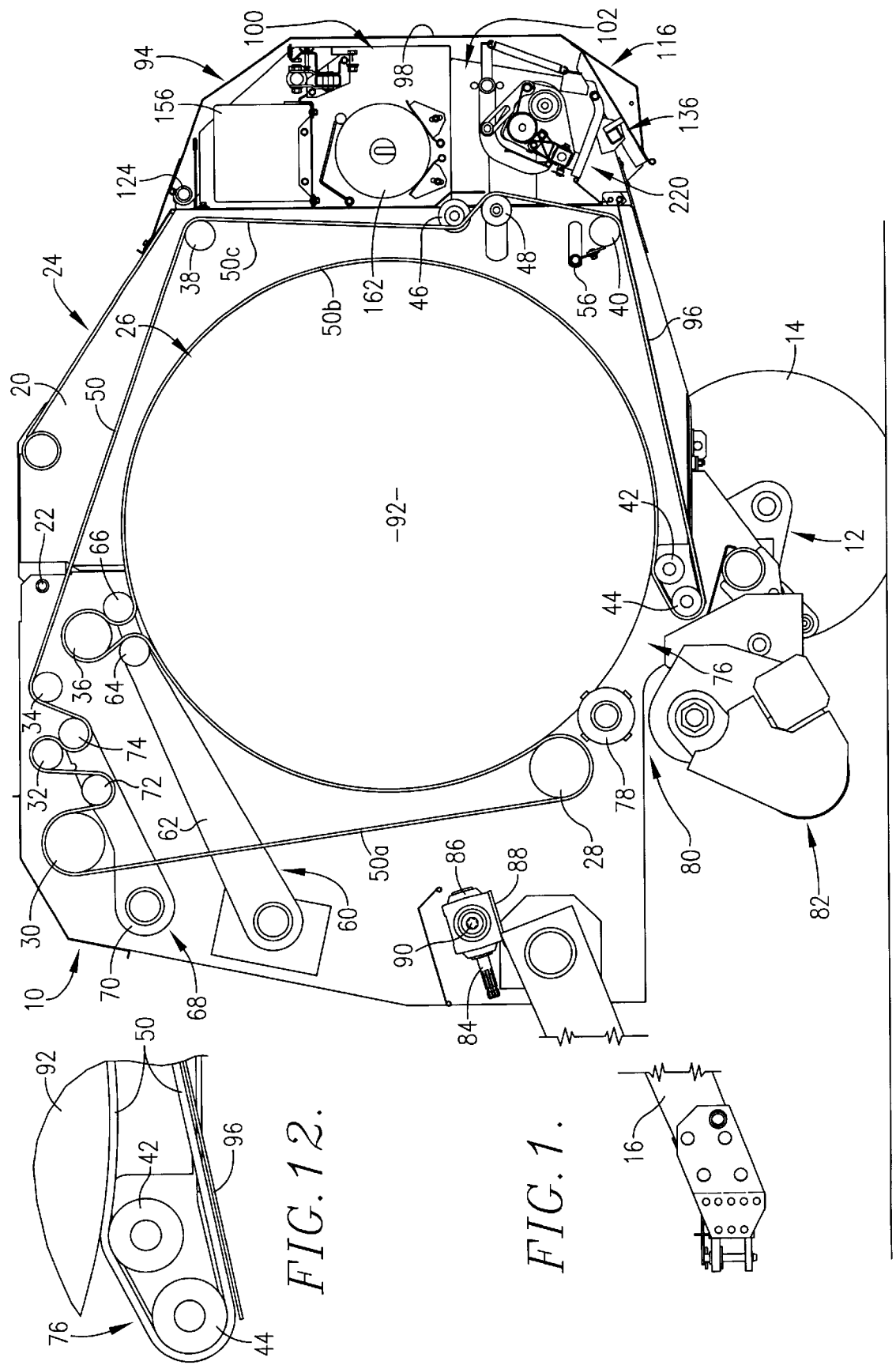
FIG. 1 is a left side elevational view of a round baler having a wrapper dispensing mechanism constructed in accordance with the principles of the present invention, with various baler components being removed to reveal internal details of construction of the baler.
Figure 11:
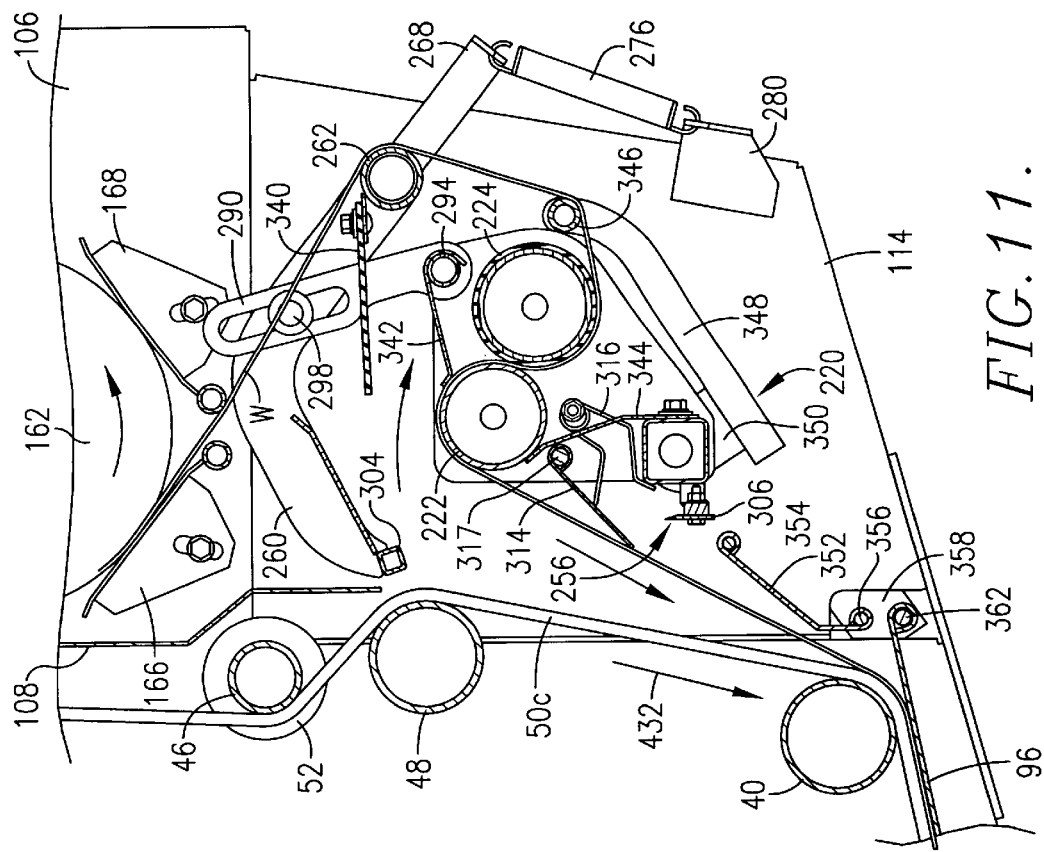

FIG. 11 is an enlarged, fragmentary left side elevational view similar to FIG. 8, but illustrating the configuration of the dispensing mechanism when the frame is in the intermediate position; and FIG. 12 is an enlarged, fragmentary left side elevational view of the round baler shown in FIG. 1, particularly illustrating the rear boundary of the chamber inlet and the pan disposed beneath the belts for maintaining the wrapper in contact with the belts as the wrapper moves toward the baling chamber.

DETAILED DESCRIPTION OF THE PREFERRED EMBODIMENTS

Turning initially to FIG. 1, the round baler 10 selected for illustration generally includes a chassis or frame 12 that is supported for travel by a pair of ground wheels 14 (only the right ground wheel being shown in the drawings figures). A tongue 16 projects forwardly from the chassis 12 for connection with a towing vehicle (not shown). The chassis 12 carries a pair of upright, laterally spaced sidewalls 18 and 20 (see also FIGS. 2–4 and 7) which cooperate to define a space within which bale forming and bale wrapping operations may be carried out as the baler is advanced across a field.

The sidewalls 18,20 present stationary forward portions fixed to the chassis 12 by suitable means and rearward portions swingably attached to the forward portions at pivot 22. The reward portions of the sidewalls 18,20 cooperatively define a tailgate 24 that is swingable between an open discharge position (not shown), in which the tailgate 24 has sufficiently raised to allow a completely formed bale to be discharged from the baler 10, and a closed baling position, in which the bale forming and wrapping operations are performed.

In the present embodiment, the baler 10 includes a bale-forming mechanism comprising a number of rolls and belts that cooperate with the sidewalls 18,20 to define an internal baling chamber 26 that assumes different shapes and sizes throughout the bale-forming cycle. In this respect, the illustrated round baler 10 is a so-called "variable chamber" belt-type machine, wherein the chamber is initially relatively small and then grows progressively larger as the bale increases in diameter within the baler 10. It will be appreciated, however, that the principles of the present invention are also applicable to a "fixed chamber" machine in which the dimensions of the baling chamber are at least substantially constant throughout the baling cycle, with the diameter of the chamber corresponding substantially with the diameter of the full size bale.

With the foregoing caveat in mind, the bale-forming mechanism of the illustrated baler 10 comprises a plurality of laterally extending, stationary rolls including a lower drive roll 28, an upper drive roll 30, and a plurality of idler rolls 32,34,36,38,40,42,44. In addition, the bale forming mechanism further includes a trash clearing roll 46 and an offsetting roll 48 positioned along the backside of the tailgate 24. The stationary rolls 28–48 are arranged between the sidewalls in a generally circular pattern (when viewing FIG. 1) for guiding a plurality of laterally spaced, endless belts 50, as the belts are driven linearly during bale formation and wrapping. As perhaps best shown in FIG. 7, the trash clearing roll 46 includes a number of laterally spaced circular discs 52 located between adjacent belts for clearing any trash which may become attached or adhered to the moving belts. It will also be noted that the offsetting roll 48 serves to shift a portion of the belts rearwardly as they move between the idler rolls 38 and 40. To further assist in preventing accumulation of trash and crop material on the belts and rolls, the baler further includes an adjustable scraper assembly 56 (see FIG. 5) having a flexible blade 58 in wiping the engagement with the idler roll 40.

The bale forming mechanism further includes a belt guiding or retaining assembly 60 having a pair of vertically swingable arms 62 (only the right arm being shown in FIG. 1) located inside the baler adjacent the sidewalls 18 and 20. The arms 62 support two idler rolls 64 and 66 in a position to directly overlie the bale during its formation within the chamber 26. Further, the arms 62 are yieldably biased downwardly so that the rolls 64,66 exert pressure against the top of the bale as it is formed. It will be noted that the belts 50 wrap under the lower drive roll 28, over the relatively large idler roll 36, and under the idler roll 44 to present a pair of opposed, front and rear belt stretches 50a and 50b that cooperate with the sidewalls 18,20 to define the chamber 26. In addition, the belts 50 are confined between the retaining rolls 64,66, and extend upwardly therefrom to wrap around the relatively larger idler roll 36, whereby the vertical belt stretches 50a and 50b converge toward one another as the retaining rolls 64,66 are approached. Although not illustrated, it will be appreciated that the baling chamber 26 consequently assumes a generally vertical, triangular configuration when the chamber 26 is empty and the arms 62 are in their lowermost position. With the drive rolls 28 and 30 rotating in a clockwise direction as depicted in FIG. 1, the front belt stretch 50a moves in a downward direction, while the rear belt stretch 50b moves in an upward direction, when the chamber 26 is empty at the beginning of a new bale forming cycle. A slack control arm assembly 68 located in the upper front portion of the baler 10 includes a pair of vertically swingable arms 70 (only one arm being shown) that support idler rolls 72 and 74. As those of ordinary skill in the art will appreciate, the assembly 68 controls the amount of slack paid out to the belts 50 as the bale grows within the chamber 26.

The chamber 26 is open at the bottom to present a chamber inlet 76 defined generally between a starter roll 78 and the idler roll 44. As the bale grows progressively larger, the idler roll 42 eventually cooperates with the idler roll 44 to define the rear boundary of the inlet 76, for purposes which will subsequently be described. The baling chamber 26 is obviously located well above and off the ground. Therefore, some means must be provided for picking up crop material as the baler moves across the field and for delivering the picked-up material into the chamber 26. In the illustrated embodiment, the baler 10 is constructed in accordance with the principles of open throat, vertical chamber baling, such that the incoming crop material is not to be subjected to any significant compression until it passes through the inlet 76 and is fully received within the baling chamber 26. Thus, that part of the crop flow path upstream from the chamber 26 is open and non-compressive and may be described as an open throat 80 through which the picked-up crop material passes on its way to the baling chamber 26.

Although not illustrated, it will be appreciated that the baler 10 preferably includes a pickup header 82 having a standard resilient rotary rake tine assembly for picking crop up off the ground. If desired, the rake tine assembly selected for use may be wider than the chamber 26 in a direction transverse to the path of travel of the machine, in which case the baler is preferably provided with center-gathering stub augers similar to those disclosed in co-pending application Ser. No. 08/731,764, filed Oct. 18, 1996 and entitled "Down Turning Stub Augers on Wide Pickup for Round Balers". In addition, the pickup header 82 may include a rigid tooth feeder positioned between the rake tine assembly and the chamber inlet 76 for delivering crop material from the rake tine assembly into the chamber 26 during successive stuffing strokes. As shown in FIG. 1, the idler rolls 44 and 42 define an eased inlet along which the crop material travels as it is projected rearwardly by the tooth feeder into the chamber 26 as disclosed in co-pending application Ser. No. 08/731,395, filed Oct. 18, 1996, and entitled "Eased Inlet Tailgate Roll Arrangement for Variable Chamber Round Baler", now U.S. Pat. No. 5,819,515. This configuration of the chamber inlet 76 provides an aggressive nip between the belts 50 and the bale to facilitate the addition of crop material to the bale during the bale-forming cycle.

Power for operating the components of the baler is delivered by a driveline (not shown) associated with the tongue 16. The front end of the driveline is adapted for connection to the power take-off shaft (also not shown) of the towing vehicle, while the rear end of the driveline is coupled with the input shaft 84 of a right angle gearbox 86 mounted to a transverse plate 88 of the chassis 12. The output shaft 90 of the gearbox 86 is coupled in the usual manner with the various drives for the baler components.

Bale Wrapping Apparatus

Once the bale reaches its full size, as illustrated in FIG. 1 and referenced by the numeral 92, it is desirable that it be tightly wrapped before being discharged from the chamber 26. In this respect, the baler 10 is provided with the apparatus 94 for wrapping the bale 92 once the bale-forming cycle has been completed. The bale wrapping apparatus 94 is disposed at the rear of the baler 10, and consequently, the wrapper dispensed by the apparatus 94 must travel forwardly to the chamber inlet 76 before having an opportunity to wrap around the bale 92. As with a number of conventional balers having the wrapper mechanism disposed at the rear of the machine, the illustrated baler 10 includes a pan 96 extending generally between the rearwardmost belt stretch 50c and the idler roll 44. In the usual manner, the pan 96 is spaced slightly below the belts 50 as they travel from the idler roll 40 to the idler roll 44, such that the forwardly moving belts serve to convey the wrapping material along the pan 96. As perhaps best shown in FIG. 12, the forwardmost end of the pan 96 is spaced just behind the rear boundary of the chamber inlet 76 for avoiding interference with the incoming crop material but sufficiently guiding the wrapping material toward the inlet 76 so that the incoming crop material and belts 50 cooperatively pull the wrapping material into the chamber 26.

Figure 5:
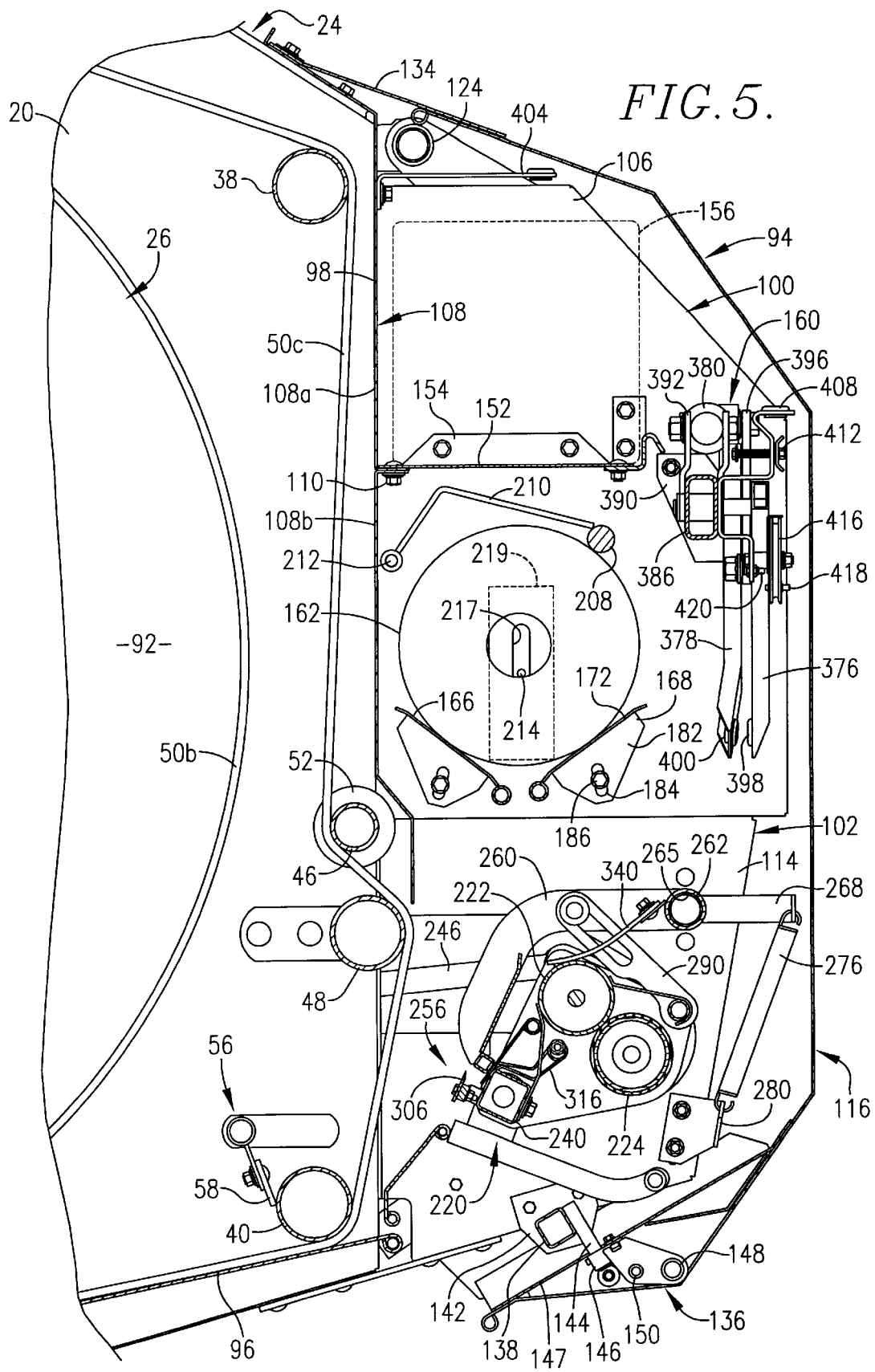
FIG. 5 is a left side elevational view similar to FIG. 2, but with the left sidewalls of the baler and the dispensing mechanism being removed to reveal internal details of construction.

The bale wrapping apparatus 94 includes a housing 98 for containing the wrapping material and the mechanism for paying out lengths of material during the bale-wrapping cycle. As perhaps best shown in FIG. 5, the housing 98 generally includes an upper compartment 100 and a lower compartment 102, although it will be appreciated that there is no dividing wall between the compartments 100 and 102. The lateral boundaries of the upper compartment 100 are defined by a pair of sidewalls 104 (see FIG. 2) and 106 (see FIG. 5) attached to the rear of the tailgate 24. Contrary to traditional baler constructions, the tailgate 24 does not include a rear wall for closing off the rear boundary of the baler 10, but rather the upper compartment 100 is separated from the tailgate 24 by a front dividing wall 108 of the housing 98, with the dividing wall 108 extending between the sidewalls 104 and 106. As shown in FIG. 5, the dividing wall 108 includes upper and lower sections 108a and 108b having cooperating juxtaposed flanges that permit fasteners 110 to attach the wall sections to one another. The upper wall section 108a has an upper angled portion that is fastened to the top of the tailgate 24. The lower wall section 108b includes a lowermost jogged portion that accommodates the trash clearing roll 46 and projects into the lower compartment 102. Except for this projection, the lower compartment 102 and the tailgate 24 are not separated from one another. In fact, because of the offsetting roll 48, the rearwardmost belt stretch 50c projects slightly into the lower compartment 102. Similar to the upper compartment 100, the lateral boundaries of the lower compartment 102 are defined by a pair of left and right sidewalls 112 and 114.

Figure 2:
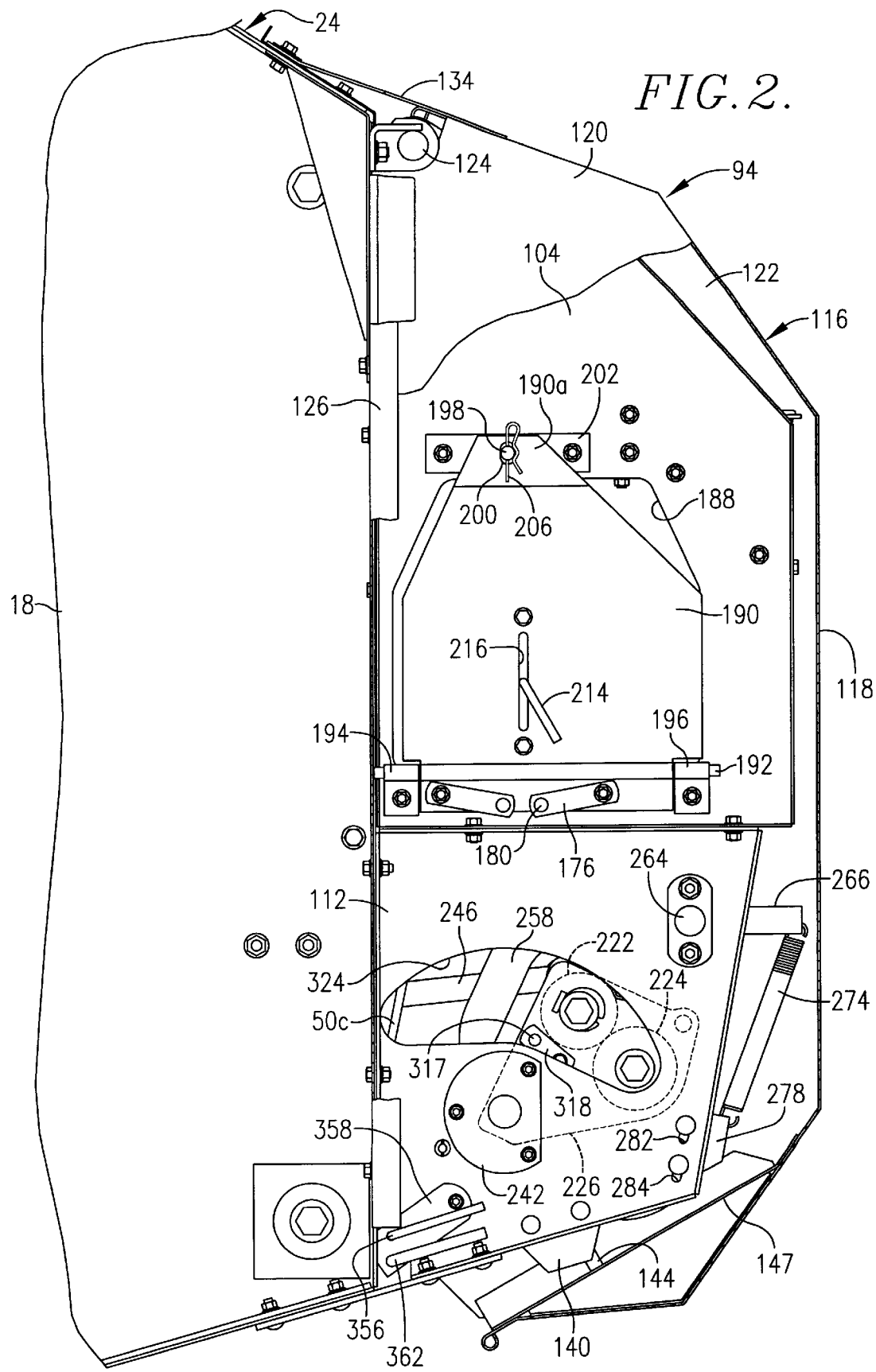
FIG. 2 is an enlarged, fragmentary left side elevational view of the rear portion of the baler shown in FIG. 1, with the cover of the dispensing mechanism being partially broken away to illustrate, among other things, the access door for the wrapping material roll compartment.
Figure 7:
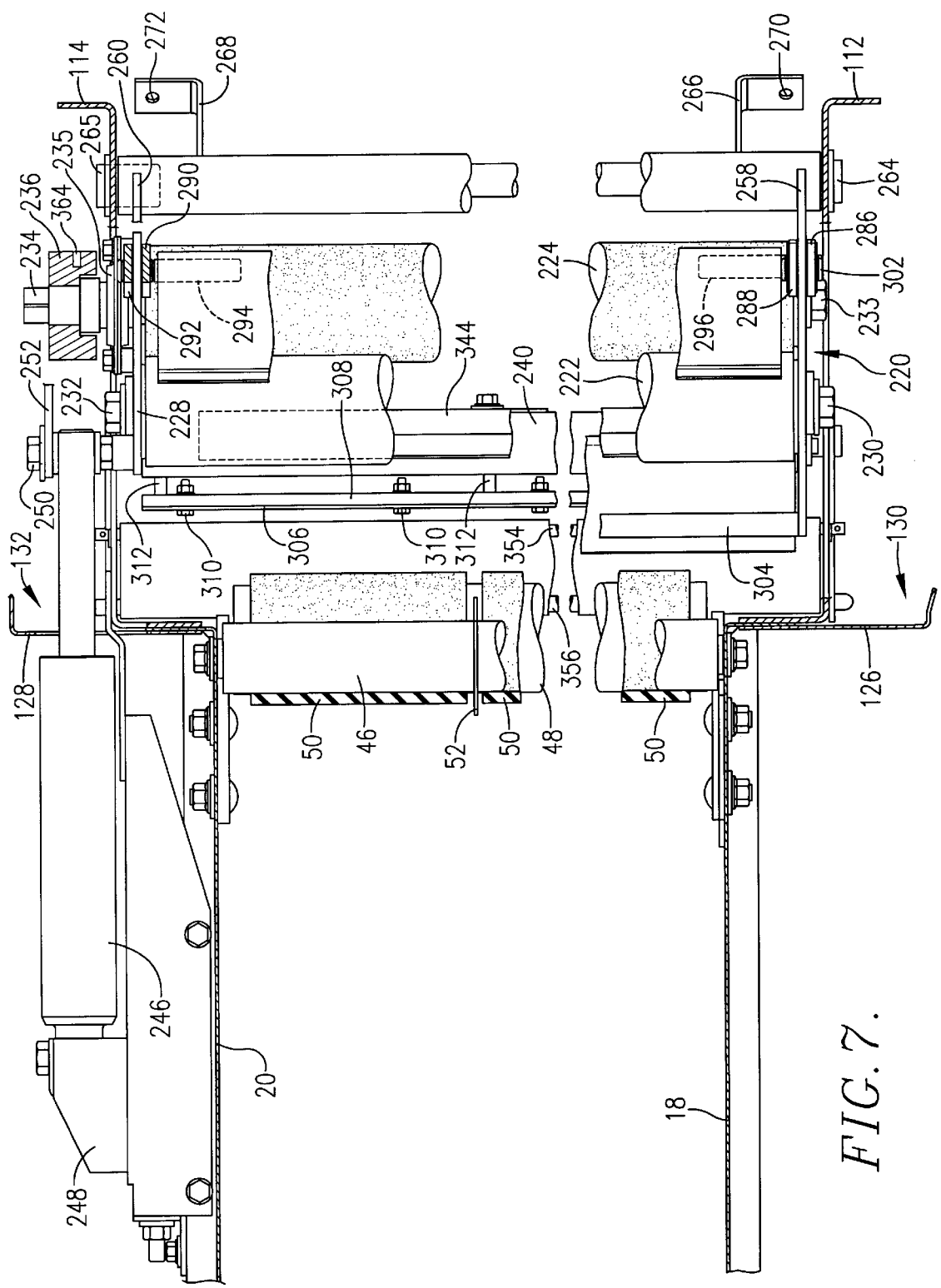
FIG. 7 is an enlarged, fragmentary horizontal cross-sectional view of the rear portion of the baler illustrated in FIG. 1, particularly illustrating the lower portion of the wrapper dispensing mechanism.

The housing 98 further includes a somewhat bowl-shaped cover 116 including a generally U-shaped rear wall 118 and sidewalls 120 and 122 (see FIGS. 2 and 5). The cover 116 is swingably mounted to the tailgate 24 at pivot 124 for movement between a closed operating position (shown in the drawing figures) and a raised position for providing access to the internal components of the wrapping apparatus 94. It will be appreciated that the upper and lower compartments 100 and 102 are open along their respective rear boundaries, and accordingly, the cover 116 serves to close off the rear of the housing 98. As shown in FIG. 7, a pair of end walls 126 and 128 project transversely from the rear of the tailgate 24 and include rearwardly extending flanges so as to define respective spaces 130 and 132 for receiving the sides of the cover 116. It will also be noted that the sidewalls 120 and 122 of the cover 116 are disposed laterally outwardly from the respective compartment sidewalls 104,112 and 106,116. A flexible flap 134 fixed to the tailgate 24 extends rearwardly to span the gap defined between the front dividing wall 108 and the rear wall 118 of the cover 116, and to overlie part of the rear wall 118, whereby ingress of crop material and other debris into the upper compartment 100 is prevented.

A handle-operated latch mechanism 136 is provided for releasably retaining the cover 116 in its closed position (see FIG. 5). The mechanism 136 includes a square-shaped tube 138 mounted between the sidewalls 120 and 122 of the lower compartment 102 by brackets 140 (see FIG. 2) and 142 (see FIG. 5). A stationary latch pin 144 projects generally rearwardly and downwardly from the center of the tube 138 for latching interengagement with a catch 146 mounted to a recessed wall 147 located centrally between the sidewalls 120,122 of the cover 116. Operation of the catch 146 is controlled by a handle 148 pivotally mounted to the cover 116 at pivot 150.

The upper compartment 100 serves to contain the sources of wrapping material, which in the illustrated embodiment include both twine and a web-type wrapper. Turning initially to the twine, a shelf 152 is mounted between the sidewalls 104 and 106 of the upper compartment 100 by brackets 154 (only the right bracket being shown in FIG. 5). The shelf 152 is configured to support a plurality of twine balls 156 thereon (see FIGS. 5 and 6a), with the spacing between the twine balls 156 being maintained by a plurality of dividers 158 projecting upwardly from the shelf 152. A twine supply assembly 160 is also located within the upper compartment 100 adjacent the shelf 152 for controlling the lateral location of the twine between the sidewalls 18 and 20 of the baler as the twine is being dispensed into the baling chamber 26. The constructional details of the assembly 160 will be further described hereinbelow.

The upper compartment 100 is particularly unique in that it permits side loading of the roll 162 of web-type wrapping material, as will subsequently be described. The roll 162 is supported within the upper compartment 100 beneath the twine shelf 152 by a laterally extending support comprising a pair of adjustable, fore-and-aft platforms 166 and 168 that are generally mirror images of one another. Thus, it shall be sufficient to explain that the aft platform 168 includes a pair of spaced apart roll engaging members 170 and 172 adjacent the respective sidewalls 104 and 106 of the upper compartment 100 (see FIG. 6A). The members 170 and 172 are fixed to a tube 174 extending between the sidewalls 104 and 106. A pair of brackets 176 (see FIG. 2) and 178 (see FIGS. 3 and 4) located exteriorly of the sidewalls 104 and 106 serve to support the platform 168 in the desired orientation. Particularly, the brackets 176 and 178 cooperatively support a cylindrical rod 180 projecting through the sidewalls 104, 106 and extending through the tube 174, such that the platform is permitted to swing about the rod 180. The aft platform 168 further includes an adjustment plate 182 projecting transversely from each of the roll engaging members 170 and 172 (only the right adjustment plate being shown in FIG. 5). The right plate 182 has a slotted hole 184 for receiving a nut-and-bolt assembly 186 fastened to the corresponding bracket 178 (see FIGS. 3–5). The nut-and-bolt assemblies 186 at each of the brackets 176,178 may consequently be loosened so that the operator can adjust the orientation of the roll engaging members 170,172. As previously indicated, the fore platform 166 is similarly adjustable. The illustrated arrangement of the platforms 166 and 168 is particularly useful because the roll remains securely nested between the platforms even as it decreases in size, although the arrangement of the platforms may be varied if desired. In addition, a laterally extending space is defined between the tubes 174 (only the aft tube being referenced in the FIG. 5) of the platforms 166 and 168 so that the wrapper may project from the roll 162 directly down into the lower compartment 102.

As perhaps best shown in FIG. 1, the platforms 166,168 are conveniently spaced above the ground at generally shoulder height. An opening 188 (see FIG. 2) defined in the left sidewall 104 of the upper compartment 100 is generally vertically aligned with the platforms 166,168 to provide access to the upper compartment 100 for loading replacement rolls of web-type material. A swingable door 190 serves to selectively cover the opening 188 during operation. A lower pivot bar 192 rotatably supports the door 190 on a pair of brackets 194 and 196 fastened to the left sidewall 104. To retain the door in the closed position shown in FIG. 2, the door 190 is releasably secured to a cylindrical rod 198 fixed relative to the left sidewall 104 to project laterally through a slotted opening 200 defined within an offset portion 190a of the door. It will be noted that the rod 198 is connected to a support plate 202 fastened to the left sidewall 104 by suitable means such as nut and bolt assemblies 204. In the illustrated embodiment, the door 190 is releasably secured to the rod 198 by a pin 206.

A cylindrically shaped, solid metal bar 208 serves as a weight for urging the roll 162 downwardly against the platforms 166, 168 so as to ensure that the roll 162 remains nested between the platforms 166 and 168 during baling operations. To maintain contact with the roll 162 as it decreases in size, the bar 208 is mounted between the sidewalls 104 and 106 of the upper compartment 100 for shifting movement by a pair of arms 210 (only the right arm being shown in FIG. 5). Each of the arms 210 is swingably mounted to the adjacent sidewall 104 or 106 by a suitable pivot 212 (only the right pivot being shown in FIG. 5). The apparatus 94 further includes structure for limiting movement of the roll 162 relative to the platforms 166, 168 when the tailgate 24 is swung between the operating and discharge positions. Particularly, a removable L-shaped rod 214 is received in the open center of the wrapper roll 162 and projects through a slot 216 defined in the door 190 (see FIG. 2) and a slot 217 defined in the right sidewall 106 of the upper compartment 100. When the tailgate 24 is swung upwardly to its discharge position, movement of the wrapper roll 162 away from the platforms 166,168 is limited by engagement of the rod 214 against the upper ends of the slots 216,217. The lower ends of the slots 216,217 are disposed sufficiently low enough to avoid interfering with downward movement of the open center of the roll 162 as the roll decreases in size. The relatively short leg of the rod 214 shown in FIG. 2 prevents inadvertent removal of the rod from the slots 216,217 and the roll 162.

Figure 6A:
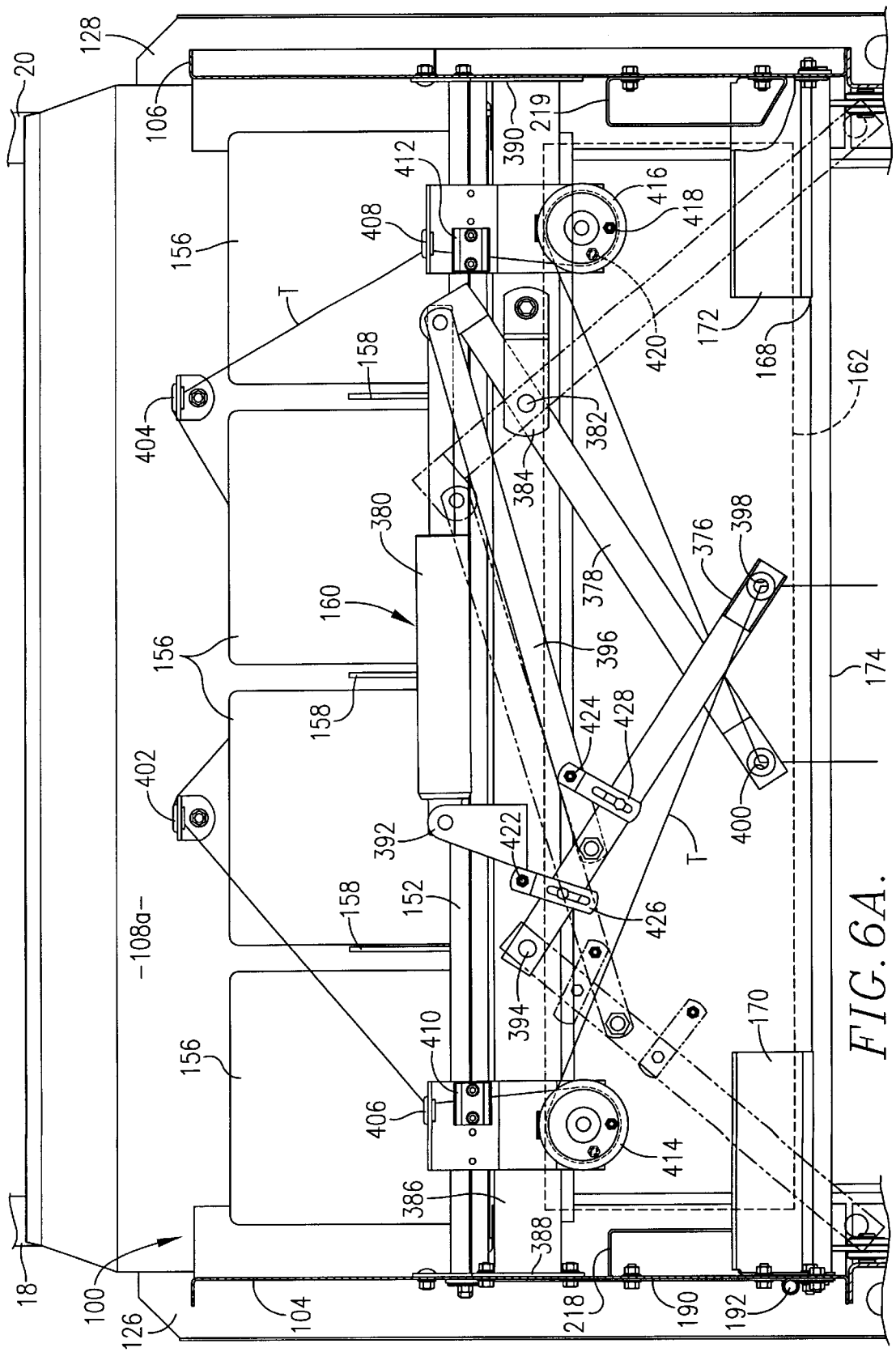
FIG. 6A is an enlarged, fragmentary rear elevational view of the upper portion of the baler, with the cover of the dispensing mechanism being removed to illustrate, among other things, the storage compartment for housing the wrapping materials and the twine supply assembly.

As perhaps best shown in FIG. 6A, spacers 218 and 219 project inwardly from the respective sidewalls 104 and 106 of the upper compartment 100 to ensure that the roll 162 remains generally centered within the housing 98 during baling operations. As indicated in FIG. 5, the spacers 218, 219 are aligned with the slots 216,217 and consequently include slotted openings for receiving the rod 214. In addition, the left spacer 218 is fastened to the door 190, while the right spacer 219 is fastened directly to the right sidewall 106.

In view of the foregoing, loading of a replacement roll of web type material has been significantly simplified. First, the cover 116 is raised to an open position, followed by removing the rod 214 completely from the slots 216,217. The pin 206 is pulled from the rod 198 and the door 190 is swung downwardly. The replacement roll is loaded endwise through the opening 188 onto the platforms 166 and 168. With the roll support and opening 188 being at generally shoulder height, the operator may consequently place the roll on his/her shoulder, insert it through the opening 188, and slide the replacement roll onto the platforms 166,168. It will also be noted that, while the cover 116 is raised, replacement twine balls may be placed onto the shelf 152 through the open rear of the upper compartment 100.

A feed device 220 located generally within the lower compartment 102 is provided for feeding wrapping material from its source (i.e., the twine balls 156 or the web-type wrapper roll 162). The device 220 includes a pair of co-acting feed rollers 222 and 224 in contacting peripheral engagement with one another so that rotation of one of the rollers causes corresponding rotation of the other. The rollers 222,224 are rotatably supported on a pair of laterally spaced apart carriage plates 226 and 228 (e.g., see FIG. 7). It will be noted that the ends of the front roller 222 include internal bearing assemblies (not shown) supported on bolt assemblies 230 and 232 fixed to the respective carriage plates 226 and 228 (see FIG. 7). The left end of the aft roller 224 is similarly journaled for rotation on the carriage plate 226 by a bolt assembly 233, while the right end includes a stub shaft 234 projecting laterally outwardly beyond the right carriage plate 228 and being rotatably supported thereon by an external bearing assembly 235. In addition, the aft roller 224 is preferably covered with a resilient material, such as rubber, so that the peripheries of the rollers may be pressed yieldably against one another in the formation of a nip therebetween. In the usual manner, the front roller 222 is adjustably mounted to the carriage plates 226 and 228 by an eccentric disk arrangement 236 (see FIG. 2) and 238 (see FIGS. 3 and 4), so as to permit the operator to adjust the aggressiveness of the nip formed between the rollers 222, 224.

Figure 3:
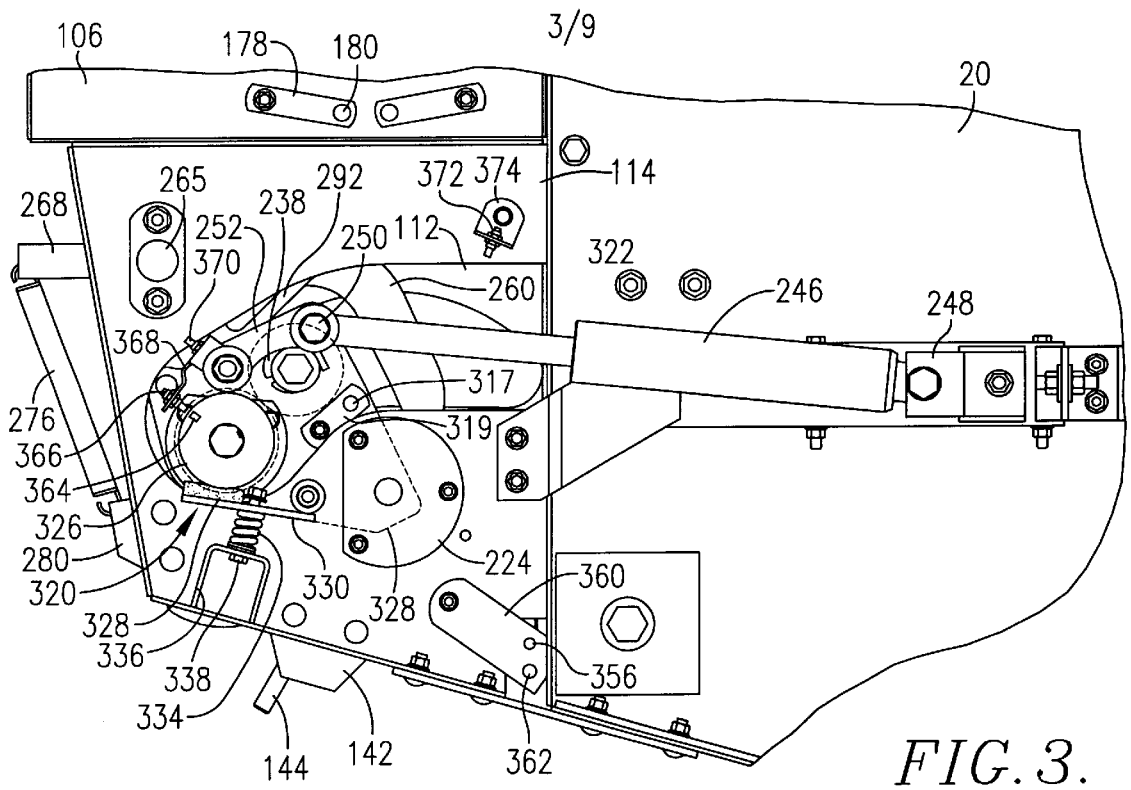
FIG. 3 is an enlarged, fragmentary right side elevational view of the lower rear portion of the baler shown in FIG. 1, with the cover of the dispensing mechanism being broken away to illustrate, among other things, the hydraulic cylinder fully extended to position the frame in the home position.
Figure 4:
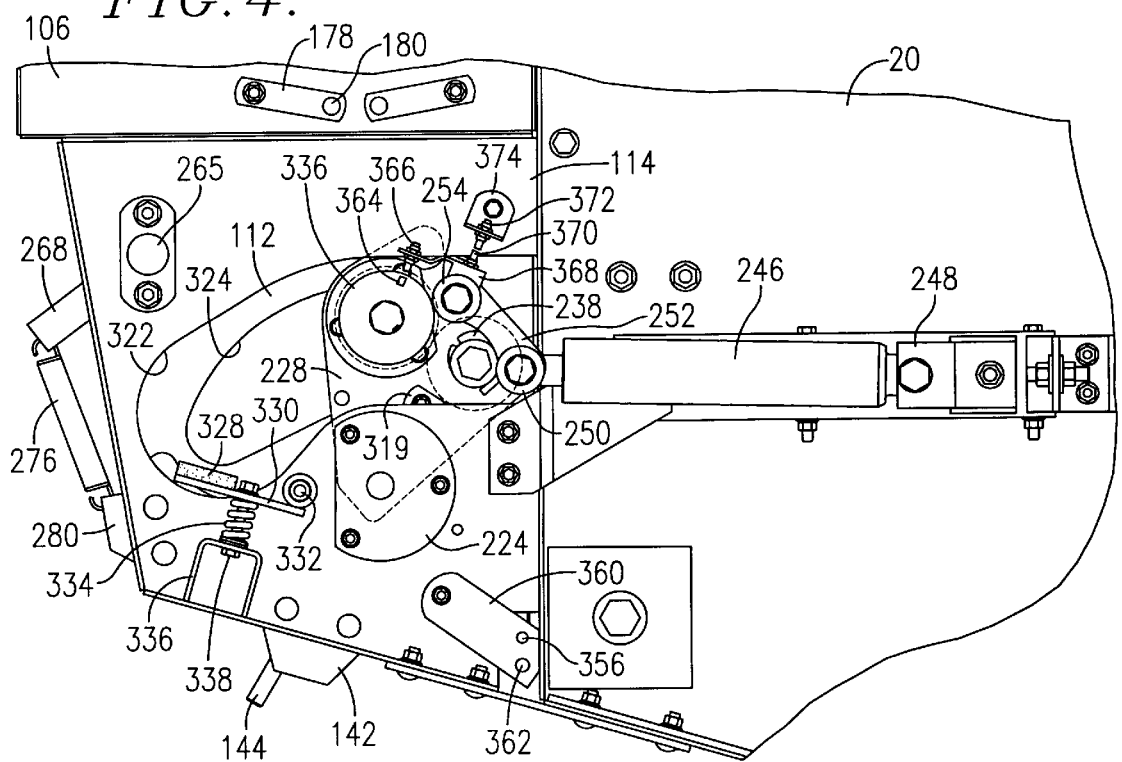
FIG. 4 is an enlarged, fragmentary right side elevation view similar to FIG. 3, but illustrating the hydraulic cylinder fully retracted to position the frame in the starting position.

The carriage plates 226,228 are swingably supported by a square-shaped tube 240 journaled on the sidewalls 112 and 114 of the lower compartment 102 by supports 242 (see FIG. 2) and 244 (see FIGS. 3 and 4). The carriage plates 226,228 are fixed to the tube 240 so that swinging movement of one of the plates corresponds to the swinging movement of the other. It may be said that the carriage plates 226,228 define a rocking framework for supporting the feed rollers 222,224 for movement about the tube 240. Movement of the carriage plates 226,228 is controlled by a hydraulic piston-and-cylinder assembly 246 connected between the right baler sidewall 20 and the right carriage plate 228, as shown in FIGS. 3–4 and 7. The cylinder end of the assembly 246 is pivotally connected to a bracket 248 adjustably mounted to the sidewall 20, which permits the operator to vary the range of rocking movement of the plates 226,228. On the other hand, the rod end of the assembly 246 is pivotally connected to the right carriage plate 228 by a bolt assembly 250. A connecting link 252 is fixed between the bolt assembly 250 and a second bolt assembly 254 attached to the right carriage plate 228. In this respect, when the assembly 246 extends, the plates 226,228 rock rearwardly about the tube 240, while retraction of the assembly 246 corresponds with forward rocking of the plates 226,228.

A cutting assembly 256 (see FIG. 5) is also provided within the lower compartment 102 for severing the wrapping material upon completion of the wrapping cycle. In the illustrated embodiment, the cutting assembly 256 is coupled with the carriage plates 226,228 in such a manner that operation of the cutting assembly 256 is controlled by the rocking action of the plates 226,228. Particularly, the cutting assembly 256 includes a pair of arms 258 and 260 fixed adjacent opposite ends of a laterally extending pivot tube 262. As illustrated in FIG. 7, a pair of axially aligned stub shafts 264 and 265 project inwardly from the sidewalls 112,114 of the lower compartment for journaling the pivot tube therebetween. A pair of spaced apart L-shaped plates 266 and 268 are fixed to the pivot tube 262 at locations spaced inwardly from the arms 258 and 260 and project in a direction generally opposite the arms 258 and 260. The laterally extending legs of the plates 266 and 268 include holes 270 and 272 (see FIG. 7) for receiving the hook-shaped end of a respective tension spring 274 (see FIG. 2) and 276 (see FIG. 5). The lower hook-shaped end of each of the springs 274 and 276 is similarly attached to a bracket 278 (see FIG. 2) and 280 (see FIG. 5) fastened to the adjacent sidewall of the lower compartment 102. As shown only in FIG. 2, a pair of slotted openings 282 and 284 are preferably provided in each of the sidewalls 112 and 114 so as to permit the operator to vary the location of the brackets 278 and 280 and thereby the bias of the springs 274 and 276. The springs 274,276 cooperatively bias the plates 266,268 in a clockwise direction (when viewing FIG. 5), thereby urging the pivot tube 262 and the arms 258,260 in the same direction.

As perhaps best shown in FIG. 7, a pair of control links 286,288 and 290,292 are connected between each carriage plate 226 and 228 and the corresponding arm 258 and 260. A rod 294 fixed to the right carriage plate 228 adjacent the aft feed roller 224 pivotally connects the lower ends of the right pair of control links 290,292 to the carriage plate 228. It will also be noted that the rod 294 projects inwardly beyond these components (as shown in phantom in FIG. 7) for purposes which will subsequently be described. The lower ends of the left pair of control links 286,288 are similarly connected to the left carriage plate 226 by a rod 296 (also shown in phantom in FIG. 7). A pin 298 projecting from opposite sides of the right arm 260 is received within elongated slots 300 (only the slot of the inner link 290 being shown in the drawing figures) defined along the length of the links 290,292, whereby movement of the arm 260 is limited relative to the carriage plate 228. Similarly, the left pair of control links 286,288 is connected to the left arm 258 by a pin-and-slot arrangement (only the pin 302 being shown in FIG. 7) for allowing only limited relative movement therebetween. It will particularly be noted that the control links 286,288 and 290,292 are connected between the carriage plates 226 and 228 and the arms 258 and 260 so as to swing the arms 258 and 260 in a generally counter clockwise direction against the bias of the springs 274 and 276, when the carriage plates 226,228 are rocked forwardly by the hydraulic power assembly 246. As will be further described below, swinging movement of the arms 258,260 is generally limited between the positions shown in FIGS. 8 and 10.

A deflector 304 in the form of a hollow square-shaped bar extends between the distal ends of the arms 258,260 for selective engagement with the wrapping material. Similar to the arms 258 and 260, movement of the deflector bar 304 is generally limited between the disengaged position shown in FIG. 8 and the cutting position shown in FIG. 10. It will be particularly noted that, as the deflector 304 moves from the disengaged position to the cutting position, it progressively engages the wrapping material and deflects the material out of its normal path of travel and against a laterally extending knife 306 to sever the material. In this respect, the cutting assembly 256 is configured to sever the wrapping material as the carriage plates 226,228 swing rearwardly from the position shown in FIG. 10 to the position shown in FIG. 8. In addition, the cutting assembly 256 severs the wrapping material with a cutting action that is similar to that used with common household plastic wrap dispensers.

The knife 306, which in the illustrated embodiment comprises a relatively flat blade, is fastened to a rectangular backing element 308 by nut and bolt assemblies 310 (see FIG. 7). The backing element 308 is appropriately spaced from and mounted to the tube 240 by spacers 312. Although the knife 306 swings with the carriage plates 226,228 as the tube 240 rotates, such movement is significantly less than the movement of the defector bar 304. It will also be noted that the deflector bar 304 engages a laterally extending kicker plate 314 as the bar swings from the disengaged position to the cutting position. A spring 316 having, one dog-shaped leg retained against the tube 240 and another dog-shaped leg pressed against the underside of the kicker plate 314, yieldably biases the plate 314 in a clockwise direction about a pivot rod 317 fixed between the carriage plates 226 and 228 by respective brackets 318 (see FIG. 2) and 319 (see FIG. 3). Accordingly, the deflector bar 304 swings the plate 314 in a counterclockwise direction against the spring bias as the bar moves to the cutting position, although the tube 240 serves as a stop to prevent movement in this direction beyond the position shown in FIG. 8. This, along with the bias of spring 316, serves to clamp the wrapping material between the deflector bar 304 and kicker plate 314 once it has been severed. Because wrapping materials tend to have tremendous resiliency, the clamping action prevents the cut end of the wrapping material from disengaging the feed device 220. The kicker plate 314 also reduces the risk of the cut end being caught on the knife 306 when the deflector bar 304 swings away from the cutting position and the wrapping cycle is initiated. Particularly, such movement of the bar 304 permits the kicker plate 314 to be biased in the clockwise direction, whereby the cut end of the wrapping material is moved up and away from the knife 306 at the start of the wrapping cycle. The kicker plate 314 provides additional advantages which will be noted hereinbelow.

To enhance the cutting action of the assembly 256, a brake 320 (see FIG. 3) is provided for stopping rotation of the feed rollers 222,224 just before the wrapping material is severed. The brake 320 is disposed exteriorly of the right sidewall 114 of the lower compartment 102, and accordingly, a somewhat arcuate opening 322 extends rearwardly from the front edge of the sidewall 114 for allowing interconnection between the brake 320 and the shiftable feed rollers 222,224. It will also be noted that the opening 322 affords access to the right carriage plate 228 so as to permit connection with the hydraulic power assembly 246. The left sidewall 112 of the lower compartment 102 similarly includes an arcuate opening 324 for accommodating the various structure of the feed device 220 projecting leftwardly beyond the sidewall 112, as the carriage plates 226,228 rock back-and-forth.

In the illustrated embodiment, the brake 320 includes a brake drum 326 disposed outside the right sidewall 114 and carried on the stub shaft 234 projecting laterally from the right end of the aft feed roller 224. A brake pad 328 is swingably mounted to the right sidewall 114 for braking interengagement with the drum 326 when the hydraulic power assembly 246 is extended (see FIG. 3). In particular, the pad 328 is fixed to an arm 330 swingably mounted to the right sidewall 114 at pivot 332. The arm 330 is yieldably biased in a clockwise direction about the pivot 332 by a spring 334 retained between the arm 330 and a U-shaped bracket 336 attached to the bottom flange of the sidewall 114. A nut and bolt assembly 338 received within the spring 334 and connected between the arm 330 and bracket 336 serves to limit swinging movement of the arm 330 relative to the bracket 336. In the illustrated embodiment, the brake pad 328 is yieldably maintained in the position shown in FIG. 4 during the wrapping cycle, until the hydraulic power assembly 246 extends sufficiently to cause interengagement between the drum 326 and the pad 328, at which point the pad 328 may shift against the spring bias as shown in FIG. 3. Again, the brake 320 stops rotation of the feed rollers 222,224 as the deflector bar 304 deflects the wrapping material against the knife 306. Because the wrapping material has sufficiently wrapped around the bale once the brake 320 is engaged, the rotating bale pulls the wrapping material taut as it is severed.

Figure 6B:
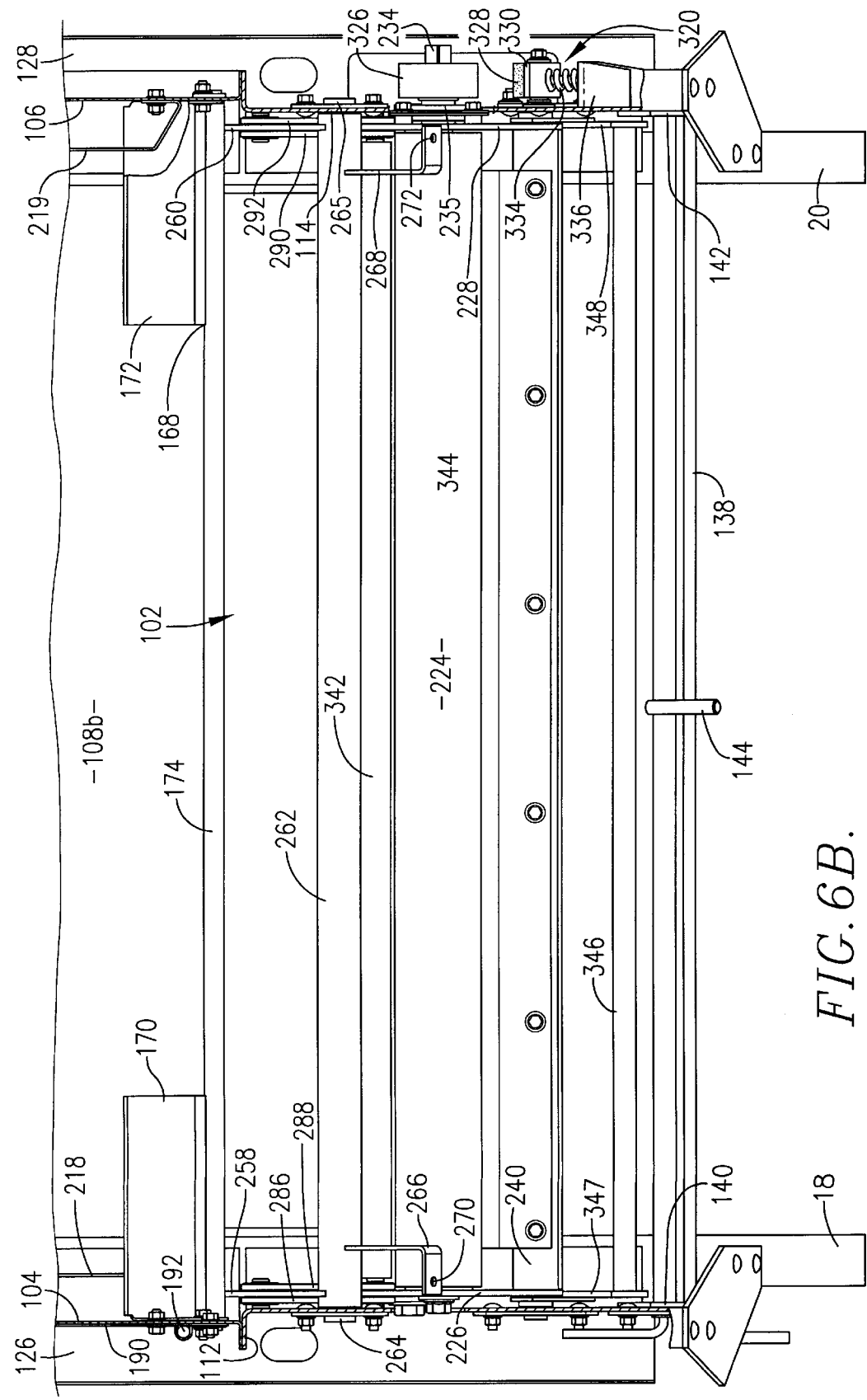
FIG. 6B is an enlarged, fragmentary rear elevational view similar to FIG. 6A, but illustrating the lower portion of the baler, including the feed device and cutting assembly.

The bale wrapping apparatus 94 includes several additional components within the lower compartment 102 for facilitating the operation of the feed device 220 and the cutting assembly 256. For example, a flexible flap 340 is attached to the pivot tube 262 for swinging movement therewith. As perhaps best shown in FIGS. 8 and 10, the flap 340 yieldably engages the front feed roller 222 when the cutting assembly is in the cutting position, disengages the feed roller 222 when the wrapping material is being dispensed. The flap 340 is particularly useful in preventing twine from disengaging the feed roller 222 once the twine has been severed. Because the strands of twine are located generally at the center of the baler upon completion of the wrapping cycle, as will subsequently be indicated, the flap 340 need only extend a relatively short distance along a center section of the pivot tube 262. A retaining plate 342 is supported by the rods 294 and 296 fixed to the respective carriage plates 226 and 228 so as to maintain its orientation relative to the front feed roller 222 as the plates rock back-and-forth. The retaining plate 342 particularly includes a section projecting from the rods 294,296 toward the front feed roller 222 and a relatively shorter section extending about the periphery of the roller 222. If desired, the retaining plate 342 may be oriented so that the relatively short section presses yieldably against the front feed roller 222. In any case, the retaining plate 342 serves to guide wrapping material about the roller 222 and prevents disengagement therefrom. A scraper panel 344 bolted to the back side of the pivot tube 240 similarly projects toward the front feed roller 222 and includes a relatively short section engaging the outer surface of the roller 222. However, contrary to the retaining plate 342, the scraper panel 344 has an edge facing a direction opposite the normal rotational direction of the feed roller 222 so as to scrape material from the outer surface of the roller 222. The scraper panel 344 also serves to prevent wrapping of twine or web-type wrapper about the front feed roller 222. As will be described further below, the wrapping material entrains a cylindrically-shaped slack take-up bar 346 extending across the lower compartment 102, with the bar 346 serving to control excess wrapping material paid out from the twine balls 156 or roll 162. It will be noted that the bar 346 is supported by a pair of arms 347 and 348 (see FIG. 6B) swingably mounted to the carriage tube supports 242 and 244 by plates 350 (only the right plate being shown in the drawing figures).

A guide plate 352 is provided in the lower compartment 102 for facilitating movement of the wrapping material toward the belt stretch 50c. The guide plate 352 includes an upper section disposed along a line extending generally between the pivot tube 240 and the idler roll 40 and a generally vertical lower section. The upper section of the guide plate 352 is swingably supported by a bar 354 connected between the sidewalls 112,114 (see FIG. 7) and received within the cylindrically-shaped end of the upper section. On the other hand, a removable rod 356 is received within the cylindrically-shaped end of the lower section. The rod 356 removably extends through a pair of brackets 358 (see FIG. 2) and 360 (see FIGS. 3 and 4) fixed to the respective sidewalls 112 and 114 of the lower compartment 102, so as to releasably maintaining the guide plate 352 in the illustrated orientation. If desired, the guide plate 352 may be selectively swung from the illustrated orientation simply by grasping the handle portion of the rod 360 (shown in FIG. 2) and pulling the rod until it is removed from the brackets 358,360. It will be appreciated that this facilitates maintenance of and access to the wrapping apparatus 94. Note, the rear cylindrically-shaped end of the pan 96 is similarly supported by a removable rod 362 projecting through the brackets 358,360, whereby the pan 96 may be selectively swung away from the belt stretch extending between the idler rolls 40 and 44 simply by removing the rod 362.

As perhaps best shown in FIGS. 3 and 4, the feed device 220 is provided with a wrapper feeding sensor associated with the aft feed roller 224. The illustrated feeding sensor comprises a Hall-effect switch assembly including a magnet 364 (see also FIG. 7) mounted to the brake drum 326 for movement therewith and a switch 366 fixed to a bracket 368 supported by the second bolt assembly 254. The state of the switch 366 is changed when the magnet 364 is generally aligned therewith, as shown in FIGS. 3 and 4, so that the number of revolutions of the drum 326 (i.e., the aft feed roller 324) may be monitored. It is also within the ambit of the present invention to utilize the feeding sensor only as a means for monitoring rotation of the feed roller 324, without counting the number of revolutions. This could be used to signal the operator that wrapping material is being dispensed. A carriage position sensor in the form of a Hall-effect switch assembly is also provided. The position sensor similarly includes a magnet 270 supported by the bracket 368 for movement with the right carriage plate 228, and a switch 372 fixed to the right sidewall 114 by a bracket 374. Consequently, the position sensor permits monitoring of when the plate 228 is in or out of the position shown in FIG. 4.

As noted above, the wrapper apparatus 94 is also provided with the twine supply assembly 160 that operates in conjunction with the feed device 220 in dispensing twine into the baling chamber 26 and around the bale. The twine supply assembly includes a pair of arms 376 and 378 (see FIGS. 5 and 6A) which control the lateral location of the dispensed twine between the sidewalls 18,20 of the baler 10. Turning initially to the right twine arm 378, a hydraulic piston-and-cylinder assembly 380 is pivotally connected to the proximal end of the arm 378 for swinging the arm about a pivot pin 382 (see FIG. 6A). It will be noted that the pivot pin 382 is supported between a plate 384 and a rectangular-shaped tube 386 supported between the sidewalls by brackets 388 and 390. In addition, the cylinder end of the assembly 380 is pivotally connected to a clevis 392 fixed to the tube 386. The left arm 376 is swingably supported by a pin 394 projecting rearwardly from the tube 386, with swinging movement of the arm 376 being controlled by a link 396 connected between the arm 376 and the rod end of the power assembly 380. It is noted that the wrapping cycle starts with the power assembly 380 extended and the arms 376,378 in the generally central locations (illustrated in full lines in FIG. 6A). The power assembly 380 subsequently retracts to swing the arms 376,378 outwardly in opposite directions to the positions shown in phantom in FIG. 6A, and then extends to return the arms 376,378 to the central locations.

The arms 376 and 378 each have an opening 398 and 340 adjacent its distal end for receiving a strand of twine T therein. As shown in FIG. 6A, the twine strands T are initially guided upwardly from different ones of the balls 156 through a pair of guides 402 and 404 projecting rearwardly from the dividing wall 108. The strands T are then directed downwardly from the guides 402 and 404 to a second pair of guides 406 and 408 mounted to the tube 386. It will be noted that each of the second guides 406 and 408 are provided with a standard spring-loaded tensioning mechanism 410 and 412 (see also FIG. 5) and a freely rotatable pulley 414 and 416. In this respect, the twine strands T extend through the tensioning mechanisms 410 and 412, around the pulleys 414 and 416, and generally downwardly through the openings 398 and 400 in the arms 376 and 378, respectively. From the arms 376,378, the twine strands T pass through the feed device 220 in a manner similar to the web-type wrapper, as will subsequently be described. However, the locations of the twine arms 376,378 determines where the twine is wrapped around the bale. That is to say, the location of the openings 398,400 generally corresponds with the location at which the twine enters the chamber and wraps around the bale (e.g., twine wraps around the bale adjacent its ends when the arms 376,378 are in the outermost positions shown in phantom in FIG. 6A).

Similar to the aft feed roller 224, a twine feeding sensor is associated with each of the pulleys 414 and 416. It will be appreciated that the feed sensors are nearly identical, and accordingly, only the feed sensor associated with the right pulley 416 will be described herein, with the understanding that the left feed sensor has the same construction. As perhaps best shown in FIG. 5, the feed sensor associated with the right pulley 416 comprises a Hall-effect switch assembly including a magnet 418 mounted to the pulley 416 for movement therewith and a switch 420 fixed to the right guide 408, whereby the state of the switch 420 is changed when the magnet 418 is generally aligned therewith. Thus, the number of revolutions of the pulleys 414,416 may be monitored. It is also within the ambit of the present invention to utilize the feeding sensors only as a means for monitoring rotation of the pulleys 414,416, without counting the number of revolutions. The twine supply assembly 160 is also provided with a position sensor for the twine arms 376,378. Although the position sensor is associated only with the left arm 376, the position of the right arm 378 is in effect monitored as a result of the direct correspondence of the arm locations. The illustrated position sensor comprises a Hall-effect switch assembly including a switch (not shown) attached to the control link 396 and a pair of magnets 422 and 424 adjustably fixed to the left arm 376 by spaced apart supports 426 and 428. It will be appreciated that the magnet 422 is aligned with the switch to change the state of the latter when the arms 376,378 are in the outer positions (shown in phantom in FIG. 6A), while the magnet 424 is aligned with the switch when the arms are in the central positions (shown in full lines in FIG. 6A). This arrangement allows monitoring of when the arms 376,378 are in or out of the central and outer positions. If desired, such monitoring may be used to permit operator control of swinging of the arms 376,378, if desired.

Operation

Once a bale has been formed within the baling chamber 26, the wrapping apparatus 94 is actuated to wrap the bale before it is discharged. Such actuation may occur automatically, which normally requires the use of a bale shape monitor to sense when the bale has been fully formed, or at the discretion of the operator. It is, of course, assumed at this point that the feed device 220 has been sufficiently prepared to begin the wrapping cycle. Such preparation requires loading of the feed device 220 with wrapping material in the manner perhaps best shown in FIG. 8. Although the web-type wrapper W is loaded in the feed device 220 in FIG. 8, it will be appreciated that the feed device 220 is similarly prepared when twine strands T are loaded therein, except that the twine strands T do not pass through the platforms 166,168. In any case, the wrapping material extends around the backside of the pivot tube 262 and downwardly toward the slack take-up bar 346. The material then wraps under the take-up bar 346 and extends forwardly and upwardly toward the aft feed roller 224 to wrap partially therearound. The material passes through the nip formed by the feed rollers 222,224 and subsequently transfers to the front feed roller 222 to wrap approximately halfway around its circumference. The material disengages the front feed roller 222 to project down between the deflector bar 304 and the kicker plate 314. In this respect, it may be necessary to shift the deflector bar 304 away from the kicker plate 314 (i.e., rock the carriage plates 226,228 slightly forward from the position shown in FIG. 8) so that the wrapping material may be inserted therebetween.

The wrapping cycle begins with the feed device 220 in the configuration shown in FIG. 8. Particularly, the power assembly 246 is extended (see FIG. 3) to position the carriage plates 226,228 in a rearwardmost position and the cutting assembly 256 in the cutting position. This configuration will generally be referred to as the home position of the carriage plates 226,228. Once the wrapping apparatus 94 is actuated to start the wrapping cycle, the power assembly 246 is retracted to rock the carriage plates 226,228 generally forwardly out of the home position. The control links 286,288,290,292 move with the carriage plates 226,228 and thereby permit the springs 274,276 to swing the arms 258,260 in a clockwise direction (when viewing FIG. 8), whereby the deflector bar 304 shifts away from the kicker plate 314. The spring 316 consequently swings the kicker plate 314 in a clockwise direction (when viewing FIG. 8), with the cut end of the wrapper being shifted by the plate 314 as the latter is swung by the spring 316. The kicker plate 314 serves to shift the cut end of the wrapper away from the knife 306 at the beginning of the wrapping cycle. Additionally, the cut end of the wrapper is shifted generally forwardly toward the rearwardmost belt stretch 50c by the kicker plate 314. It will be noted in FIG. 8 that the cut end of the wrapper is spaced downstream from the feed roller 222 such that a length of the wrapper dangles from the roller 222 when the wrapper is released from the grasp of the deflector bar 304 and kicker plate 314.

In FIG. 9, the feed device 220 is depicted just after the start of the wrapping cycle, with forward rocking of the carriage plates 226,228 being represented by an arrow 430. Moreover, the deflector bar 304 has shifted sufficiently that one of the dog-shaped legs of the spring 316 has engaged the proximal end of the kicker plate 314, thereby defining a limit for swinging movement of the plate 314 in a clockwise direction. At this point, the kicker plate 314 projects forwardly and slightly upwardly to ensure that the cut end of the wrapper does not catch on the knife 306 and is ready for engagement with the rearwardmost belt stretch 50c. Because the wrapper is trapped between the feed rolls 222,224, the take-up bar 346 shifts with the carriage plate 226,228 (compare FIGS. 8 and 9), although the shifting of these components may not be equal. It is also noted that the flexible flap 340 has shifted with the pivot tube 262 and has consequently disengaged the front feed roller 222.

Figure 10:
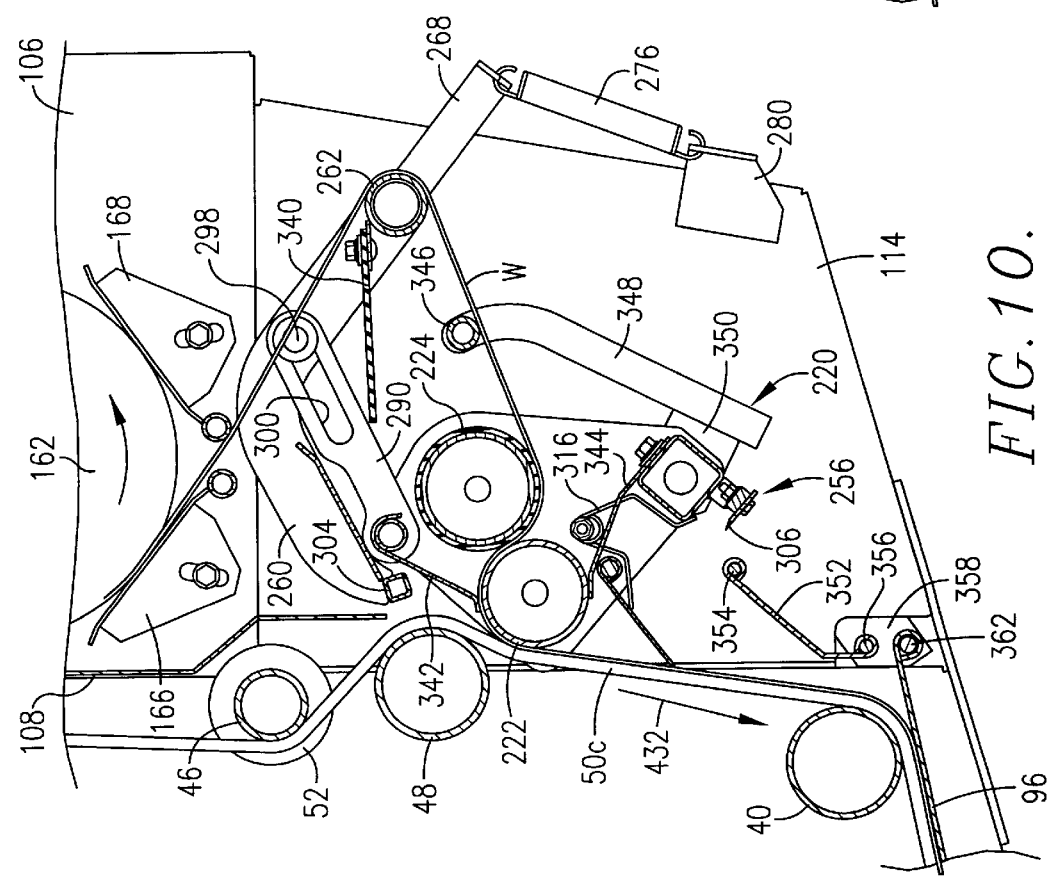
FIG. 10 is an enlarged, fragmentary left side elevational view similar to FIG. 8, but illustrating the configuration of the dispensing mechanism when the frame is in the starting position.

The power assembly 246 continues to retract until the front feed roller 222 engages the belt stretch 50c, as depicted in FIGS. 4 and 10. This forwardmost position of the carriage plates 226,228 will be referred to as the starting position. The belt stretch 50c is moving generally downwardly, as noted by the arrow 432, and consequently imparts counter-clockwise rotational movement (when viewing FIG. 10) to the front feed roller 222. The aft feed roller 224 is therefore rotated in a clockwise direction (when view FIG. 10), such that the wrapper moves through the nip defined by the feed rollers 222,224. In addition, the engagement of the front feed roller 222 against the belt stretch 50c creates a nip downstream from the nip defined by the feed rollers 222,224, whereby the wrapper is trapped between the front feed roller 222 and the belt stretch 50c. This second nip pulls the wrapper about the front feed roller 222 and, because of the free-wheeling nature of the feed rollers 222,224, serves as the primary feeding nip for pulling wrapper from the roll 162, although the nip defined between the feed rollers 222,224 assists with dispensing of the wrapper. After passing through the nip defined between the front feed roller 222 and the belt stretch 50c, the wrapper disengages the front feed roller 222 and is conveyed downwardly and then forwardly along the pan 96 by the belts. The wrapper is subsequently projected from the front end of the pan 96 and is then turned around the idler roll 44 by the belts 50 and the inflowing crop material to pass through the chamber inlet 76 and toward the bale 92 supported on the idler roll 42 (see FIGS. 1 and 12). Once the wrapper reaches the chamber 26, it is grasped by the bale 92 so that the rotating bale now also pulls the wrapper (note, in some instances, the wrapper is grasped between the bale 92 and the belts 50).

It will be appreciated that there are several distinct advantages provided by the manner in which the wrapping cycled is started. For example, because the feed rollers 222,224 are driven by the belts 50, the wrapper is pulled by the rollers 222,224 at generally the same speed at which the wrapper is conveyed by the belts 50 and/or the rotating bale 92 downstream from the feed rollers 222,224. This virtually eliminates the risk of back-wrapping onto the feed rollers, and the various other problems caused by the different speeds at which the wrapper may be pulled from the roll in a conventional wrapping mechanism. In addition, with the cutting assembly 256 severing the wrapper downstream from the nip defined between the front feed roller 222 and the belt stretch 50c, the wrapper remains wrapped around the front feed roller 222 once it is released from the grasp of the deflector bar 304 and the kicker plate 314. Accordingly, this configuration ensures that the wrapper is trapped between the front feed roller 222 and the belt stretch 50c each time the wrapping cycle is started, regardless of the resiliency of the wrapping material. Yet another advantage is the fact that the wrapper is placed directly into contact with the belts 50 that serve to convey the wrapper into the baling chamber 26, rather than relying on uncontrolled movement of the wrapper between spaced apart feed rollers and conveying belts, as is traditionally done with conventional wrapping mechanisms.

As noted above, in most conventional wrapping mechanisms, the wrapper is required to travel some distance between the feed rollers and the conveying belts, with the mechanism typically relying on gravity to guide the wrapper from the feed rollers to the conveying belts. Movement of the wrapper between the feed rollers and conveying belts is therefore highly susceptible to being misdirected. In addition, the cutting assembly in most conventional wrapping mechanisms is spaced between the feed rollers and the conveying belts, thereby presenting a potential obstruction on which the wrapper could catch as it travels from the feed rollers to the conveying belts. The present invention has virtually eliminated these problems.

It will be noted that the kicker plate 314 likely places the cut end of the wrapper into contact with the belt stretch 50c before the nip is formed between the front feed roller 222 and the belt stretch 50c. Although the wrapper will consequently be urged downwardly by the belt stretch 50c, it is unlikely that the wrapper will be pulled from the roll 162 until the nip is formed between the front feed roller 222 and the belt stretch 50c. Once this nip is formed, the kicker plate 314 continues to yieldably press against the belt stretch 50c, as shown in FIG. 10, so as to facilitate interengagement of the wrapper and belt stretch 50c downstream from the nip. It will also be noted that the guide plate 352 assists with wrapper movement toward the pan 96 should the wrapper become disengaged from the belt stretch 50c downstream from the nip formed between the front feed roller 222 and the belt stretch 50c.

It will be appreciated that the power assembly 246 is preferably connected with an automatic control mechanism (not shown) connected to the feed sensing switch 366 for monitoring the number of revolutions of the aft feed roller 224. In this respect, the control mechanism may be configured to retract the power assembly 246 when the aft feed roller 224 has rotated a predetermined number of times. In the illustrated embodiment, the predetermined number of revolutions corresponds with a length of wrapper that extends sufficiently into the baling chamber to be grasped by the rotating bale 92 and/or the belts 50. The power assembly 246 is then partially extended until the front feed roller 222 disengages the belt stretch 50c, at which point the carriage plates 226,228 are maintained in an intermediate position (shown in FIG. 11) until the control mechanism senses, by monitoring the number of revolutions of the aft feed roller 224, that the wrapper has been paid out to sufficiently wrap the bale 92. The control mechanism may also be coupled to the position switch 372 to warn the operator when the carriage plates 226,228 are not rocking properly back-and-forth.

There are several advantages to shifting the carriage plates 226,228 to the intermediate position once the wrapper is being pulled by the rotating the bale 92 and/or belts 50. For example, decreasing the time the front feed roller 222 engages the belt stretch 50c reduces the risk of trash and debris being transferred from the belts to the feed rollers 222,224. It will be noted that the trash clearing roll 46 further decreases the likelihood of trash or debris being transferred to the feed rollers 222,224 from the belts 50. In addition, with only the rotating bale pulling the wrapper from the roll 162, the risk of various feeding speeds (e.g., overfeeding or underfeeding of powered feed rollers commonly used in conventional wrapping mechanisms) is eliminated.

Once the control mechanism senses that the bale has been sufficiently wrapped (e.g., one and one-half convolutions around the bale), the power assembly 246 is fully retracted to return the carriage plates 226,228 to the home position and the cutting assembly 256 to the cutting position (see FIG. 8). The wrapper is consequently severed as noted hereinabove. The bale may subsequently be discharged by raising the tailgate 24, and the baling cycle may then be restarted.

It will be appreciated that when the twine is dispensed by the apparatus 94, the wrapping cycle is nearly identical to that described above, except the lateral location of twine strands T is controlled by the arms 376,378, as previously noted. In addition, the control mechanism may be coupled to the feed and position sensing switches 420 of the twine supply assembly 160 rather than the sensing switches 366, 372 of the feed device 220.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the wrapping apparatus 94 may be provided on a baler having several sets of endless belts, such as those commonly used in fixed chamber balers, with access to the baling chamber being provided between two sets of belts. In this respect, the feed device may be associated with one of the sets of belts so that the wrapping material enters the chamber between adjacent sets of belts rather than through the chamber inlet. The wrapping apparatus 94 may alternatively be provided with a fixed chamber baler having a plurality of rolls fixed in a generally circular configuration, wherein the front feed roller of the feed device is brought into engagement with one of the bale-forming rolls and thereby fed into the baling chamber between adjacent bale-forming rolls.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a round baler having bale-forming mechanism and wrapper dispensing mechanism for wrapping a formed bale with a length of wrapping material during a wrapping cycle, said bale-forming mechanism defining a baling chamber and including an element that moves toward an access opening defined in the chamber, the improvement comprising:

a feed roller;

a frame supporting said feed roller and being shiftable generally toward and away from the element to such an extent as to permit said feed roller to be selectively brought into and out of engagement with the element, said feed roller and the element cooperatively defining a temporary nip therebetween for paying out the wrapping material when said feed roller engages the element;

a cutting assembly disposed for severing the wrapping material at the conclusion of the wrapping cycle, said cutting assembly being positioned to sever the wrapping material at a point downstream from said temporary nip with respect to the normal direction of travel of the material during the wrapping cycle; and power apparatus operably coupled with the frame for shifting the frame between a first position during bale formation in which said feed roller is spaced away from the element, and a second position in which said feed roller engages the element and the wrapping material is trapped within the temporary nip, whereby the material is paid out by said feed roll and the element and pulled into the baling chamber through the opening by the element.

2. In a round baler having bale-forming mechanism and wrapper dispensing mechanism for wrapping a formed bale with a length of wrapping material during a wrapping cycle, said bale-forming mechanism defining a baling chamber and including an element that moves toward an access opening defined in the chamber, the improvement comprising:

a feed roller;

a frame supporting said feed roller and being shiftable generally toward and away from the element to such an extent as to permit said feed roller to be selectively brought into and out of engagement with the element, said feed roller and the element cooperatively defining a temporary nip therebetween for paying out the wrapping material when said feed roller engages the element;

a cutting assembly disposed for severing the wrapping material at the conclusion of the wrapping cycle, said cutting assembly being positioned to sever the wrapping material at a point downstream from said temporary nip with respect to the normal direction of travel of the material during the wrapping cycle;

power apparatus operably coupled with the frame for shifting the frame between a first position during bale formation in which said feed roller is spaced away from the element, and a second position in which said feed roller engages the element and the wrapping material is trapped within the temporary nip, whereby the material is paid out by said feed roll and the element and pulled into the baling chamber through the opening by the element; and a second feed roller supported on the frame to cooperatively define a relatively constant nip with the first-mentioned feed roller for paying out the wrapping material when the rollers are rotated, said temporary nip being located downstream from the constant nip with respect to the normal direction of travel of the wrapping material during operation.

3. In a round baler as claimed in claim 2; and a brake operably associated with said feed rollers and actuatable at the conclusion of the wrapping cycle for stopping rotation of the feed rollers whereby to cause the bale to draw the wrapping material taut during severance by the cutting assembly.

4. In a round baler as claimed in claim 1, said cutting assembly including a transverse knife carried on the frame on one side of the wrapping material, a transverse, movable bar extending generally parallel to the knife on the opposite side of the wrapping material, and linkage operably interconnecting the frame and the bar in such a manner as to cause the bar to deflect the wrapping material against the knife and sever the material as the frame returns to the first position.

5. In a round baler as claimed in claim 1, said frame being pivotally mounted whereby said movement thereof between its first and second positions is a rocking movement.

6. In a round baler as claimed in claim 1; and a chamber inlet defining the access opening through which the wrapping material enters the chamber.

7. In a round baler as claimed in claim 1, said power apparatus being operable to shift the frame to the second position at the beginning of the wrapping cycle so that the temporary nip exists for an initial period of time until the wrapping material enters the baling chamber through the opening and begins to be pulled by the bale rotating in the chamber, then shift the frame away from the element to an intermediate position in which the temporary nip no longer exists so that the rotating bale is pulling the wrapping material without the assistance of the temporary nip, and then shifting the frame back to the first position.

8. In a round baler as claimed in claim 7, said cutting assembly being operable to sever the wrapping material when the frame shifts from the intermediate position to the first position, such that the frame is maintained in the intermediate position until the bale has been sufficiently wrapped.

9. In a round baler having bale-forming mechanism and wrapper dispensing mechanism for wrapping a formed bale with a length of wrapping material, said bale-forming mechanism including a set of belts arranged in such a manner as to define a baling chamber and an access opening to the chamber, said set of belts including a stretch that moves toward the access opening during the wrapping cycle of the baler, the improvement comprising:

a source of supply of wrapping material;

a pair of co-acting feed rollers;

a frame supporting said rollers in such a position as to define a first nip between the rollers through which the wrapping material passes as the material is dispensed to a bale from said source of supply, said material being disposed to partially entrain a peripheral portion of one of said feed rollers at a location downstream from the first nip with respect to the normal direction of travel of the wrapping material during operation, said frame being movable generally toward and away from said belt stretch to such an extent as to permit said peripheral portion of said one feed roller to be selectively brought into and out of engagement with said belt stretch to define a second nip between the one feed roller and the belt stretch;

a cutting assembly disposed for severing the length of wrapping material from the source of supply at the conclusion of the wrapping cycle, said cutting assembly being positioned to sever the wrapping material at a point downstream from said second nip with respect to the normal direction of travel of the material during the wrapping cycle; and selectively actuatable power apparatus operably coupled with the frame for effecting said movement of the frame and for holding the frame in a selected position, said power apparatus being capable of maintaining the frame in a home position during bale formation in which the peripheral portion of the one feed roller is spaced away from said belt stretch, then shifting the frame to a starting position at the conclusion of bale formation in which the one feed roller forms said second nip with said belt stretch for an initial period of time such that the wrapping material is trapped within the second nip whereby to cause the wrapping material to be pulled from the source of supply by the belt stretch and to rotate the rollers until the wrapping material enters the baling chamber through the opening and begins to be pulled by the rotating bale, then shifting the frame away from the belt stretch to an intermediate position in which the second nip no longer exists so that the rotating bale is pulling the wrapping material without the assistance of the second nip, and then shifting the frame back to the home position for severance of the wrapping material by the cutting assembly.

10. In a round baler as claimed in claim 9, said wrapping material comprising a web of material.

11. In a round baler as claimed in claim 10, said web of material comprising mesh wrap.

12. In a round baler as claimed in claim 9, said wrapping material comprising twine.

13. In a round baler as claimed in claim 9; and a brake operably associated with said feed rollers and actuatable at the conclusion of the wrapping cycle for stopping rotation of the feed rollers whereby to cause the bale to draw the wrapping material taut during severance by the cutting assembly.

14. In a round baler as claimed in claim 13, said cutting assembly including a transverse knife carried on the frame on one side of the wrapping material, a transverse, movable bar extending generally parallel to the knife on the opposite side of the wrapping material, and linkage operably interconnecting the frame and the bar in such a manner as to cause the bar to deflect the wrapping material against the knife and sever the material as the frame returns to its home position.

15. In a round baler as claimed in claim 9, said frame being pivotally mounted whereby said movement thereof between its home, starting and intermediate positions is a rocking movement.

16. In a round baler for forming a round bale and wrapping the bale with wrapper material before the wrapped bale is discharged from the baler, a side-loading dispenser for the wrapper material including:

structure defining a compartment;

a support located within said compartment and disposed to carry a generally cylindrical roll of wrapper material in such an orientation that the longitudinal axis of the roll of material extends generally transverse to the normal direction of travel of the baler, said support being configured to permit material to pay out from the roll during the wrapping cycle of the baler; and mechanism disposed for paying out a length of wrapper material from the roll and severing the paid out length of material from the roll during each wrapping cycle, said structure including a side wall having a loading hole and a door removably covering said hole, said loading hole being generally aligned with said support whereby to permit replacement rolls of wrapper material to be loaded endwise into the compartment through the side wall when the door is opened.

17. In a round baler as claimed in claim 16, said loading hole being spaced above the ground approximately at shoulder-height to facilitate loading.

18. In a round baler for forming a round bale and wrapping the bale with wrapper material before the wrapped bale is discharged from the baler, a side-loading dispenser for the wrapper material including:

structure defining a compartment;

a support located within said compartment and disposed to carry a generally cylindrical roll of wrapper material in such an orientation that the longitudinal axis of the roll of material extends generally transverse to the normal direction of travel of the baler, said support being configured to permit material to pay out from the roll during the wrapping cycle of the baler;

mechanism disposed for paying out a length of wrapper material from the roll and severing the paid out length of material from the roll during each wrapping cycle, said structure including a side wall having a loading hole and a door removably covering said hole, said loading hole being generally aligned with said support whereby to permit replacement rolls of wrapper material to be loaded endwise into the compartment through the side wall when the door is opened, said loading hole being spaced above the ground approximately at shoulder-height to facilitate loading, said mechanism being located within a second compartment disposed below the compartment in which said support is located; and an outer hood enclosing both of said compartments, said hood being movable between a closed position covering said door and an open position permitting access to the door.

19. In a round baler as claimed in claim 18, said hood being mounted for swinging movement between said open and closed positions.

20. In a round baler as claimed in claim 19, said door being mounted for swinging movement between open and closed conditions.

21. In a round baler as claimed in claim 16, said door being mounted for swinging movement between open and closed conditions.

* * * * *